US005603873A

United States Patent [19]

Ingram et al.

[11] Patent Number: 5,603,873

[45] **Date of Patent: *Feb. 18, 1997**

[54] METHOD OF MAKING COMPRESSION MOLDED PRODUCTS

[75] Inventors: Keith W. Ingram, Portage; Timothy W. Miller, Sturgis, both of Mich.

[73] Assignee: Owens-Illinois Closure Inc., Toledo, Ohio

[ * ] Notice: The term of this patent shall not extend beyond the expiration date of Pat. No. 5,328,650.

[21] Appl. No.: 241,902

[22] Filed: May 12, 1994

Related U.S. Application Data

[62] Division of Ser. No. 773,167, Oct. 8, 1991, Pat. No. 5,328,650.

[51] Int. Cl.$^6$ .................... B29C 43/00

[52] U.S. Cl. .................... 264/45.3; 264/54; 264/125; 264/320; 264/321

[58] Field of Search .................... 264/45.3, 45.9, 264/50, 51, 54, 328.12, 102, 319, 125, 321, 320

[56] References Cited

U.S. PATENT DOCUMENTS

| | | | |
|---|---|---|---|
| 3,089,857 | 5/1963 | Pottenger | 264/53 |
| 3,640,861 | 2/1972 | Hsia | 264/50 |
| 3,655,863 | 4/1972 | Andersen et al. | 264/331.12 |
| 3,962,154 | 6/1976 | Egli | 264/54 |
| 4,164,385 | 8/1979 | Finkensiep | 425/204 |
| 4,277,182 | 7/1981 | Kruder | 425/208 |
| 4,302,410 | 11/1981 | Beach | 264/54 |
| 4,374,795 | 2/1983 | Keilp | 264/152 |
| 4,548,776 | 10/1985 | Holdredge, Jr. | 264/53 |
| 4,552,708 | 11/1985 | Kimura et al. | 264/54 |
| 4,596,684 | 6/1986 | Kumasaka et al. | 264/54 |
| 4,755,343 | 7/1988 | Kromrey | 264/102 |
| 4,828,771 | 5/1989 | Kishima et al. | 264/331.12 |
| 5,023,041 | 6/1991 | Jones et al. | 264/328.7 |
| 5,328,650 | 7/1994 | Ingram et al. | 264/54 |

*Primary Examiner*—Allan R. Kuhns

[57] ABSTRACT

The method of compression molding an article such as a closure wherein a thermoplastic resin is mixed with additives including a metallic pigment additive, extruded through a nozzle, cut by a blade into individual pellets, and each pellet is deposited into the cavity of a mold which is then closed to compression mold the pellet into an article, including the step of adding a blowing agent to the resin prior to extrusion in a quantity sufficient to randomize the metallic particles in the metallic pigment additive such that gaseous bubbles are provided in the extruded melt and that the gaseous bubbles are substantially expelled during the compression molding resulting in an article that is substantially free of blemishes which normally occur. Preferably, the method includes positioning a mixer plate in the path of the resin immediately prior to the nozzle.

14 Claims, 2 Drawing Sheets

13

18

17

16

14

11
12
13
2
2
16
14

13
18
17
16
14

METHOD OF MAKING COMPRESSION MOLDED PRODUCTS

This application is a division of Ser. No. 07/773,167, filed Oct. 8, 1991, now U.S. Pat. No. 5,328,650.

This invention relates to compression molding plastic articles such as closures wherein the resin includes metallic flakes.

SUMMARY OF THE INVENTION

A conventional melt delivery system used for compression molding is illustrated schematically in FIG. 1. The resin along with metered quantities of colorant and the additives are mixed and fed into the resin hopper, and subsequently travel through the extruder for melting and blending. At the exit to the extruder, the melt is metered by a melt pump, providing a controlled volume of extrudate out of the melt pump. If the molds are in a remote position, the extrudate passes through a hose or conduit to a nozzle. As the extrudate emerges from the nozzle, it is cut by a rotating blade into individual pellets and deposited into successive cavities as they are conveyed beneath the cutter blade.

Such a process has previously been unsuccessful in the molding resin containing metallic pigment additives due to the formation of an aesthetically objectionable pellet blemish on the surface of the article. For example, when the article is a closure having a base wall and a peripheral skirt, with threads on a surface thereof, such a blemish is readily noticed on the base wall. We have found that the above described delivery system causes the metallic flakes in the pigment to align in the direction of flow through the hose and nozzle such that they are parallel with the axis of the cylindrical shaped pellet as it exits the nozzle. Referring to FIG. 2, during the cut off of the pellet, this alignment remains largely undisturbed, such that at the juncture of the cylindrical sides of the pellet and the circular ends of the pellet, there is an abrupt change in alignment of the metallic flakes. We have found that this change in alignment is a major contributor of the pellet blemish effect, whereby the pellet is deposited in the cool cavity in a fairly random way, and the flake alignment becomes "frozen in" as the "skin" solidifies during forming against the cool cavity.

The material flow action during compression molding differs from that of injection molding. In compression molding, the pellet is placed in contact with the surface of the open mold and remains in this initial position for the period of time required to close the mold. Only during the final stages of the closing of the mold does the pellet begin to be deformed and to be displaced to fill the mold. At this time, the material within the pellet is flowing, whereas the initial contact or "skin" area of the pellet remains essentially in its original position. This differs from injection molding where the material flows in from a central gate of small diameter, and immediately flows radially outward into a fully closed mold. This flow in injection molding results in alignment of the flakes as the melt is forced through the thin sections of the closed mold immediately. Alignment of the flakes parallel to the closure wall results in a good metallic appearance.

We have found that to address this problem in compression molding from a melt supplied in pellet form, it is necessary to randomize the flake particles immediately before entering the mold. This dispersal of flakes in the finished product reduces the effect of the abrupt change in alignment of the metallic flakes previously evident at the junction of the pellet ends and sides. Generally, however, any dispersal of orientation of the flakes also reduces somewhat the overall metallic effect at the top of the article such as a closure. The pellet blemish effect can be reduced by including a non-smooth surface, such as a Charmille finish of #27, or by etching a suitable pattern in the base of the cavity.

We have found that by adding a suitable blowing agent with the resin, it is possible to further increase the randomization of the flakes by using a heated mixer device.

The combination of blowing agent and mixer plate has been found to provide other advantages: by encouraging further foaming at the mixer plate by heat control, the mixer plate is more effective, due to the added mixing effect of the foam, and possibly an increase in pressure drop across the mixer plate.

The addition of foam to the pellet has further advantages, namely, the gas in tiny bubbles within the melt acts as initial insulation from the mold surfaces, reducing the freeze off effect and improving flow. However, the completed closure does not retain any significant amount of gas pockets due to the high venting achieved and almost all the gas is expelled during forming.

DETAILED DESCRIPTION OF THE INVENTION

Figure 1:
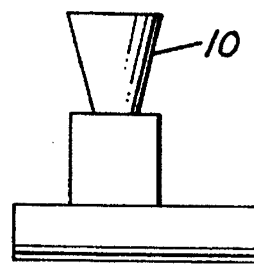
FIG. 1 is a schematic view of the prior art method of making compression molded articles such as closures.

A conventional melt delivery system used for compression molding is illustrated schematically in FIG. 1. The resin along with metered quantities of colorant and the additives are mixed and fed into the resin hopper 10, and subsequently travel through the extruder 11 for melting and blending. At the exit to the extruder 11, the melt is metered by a melt pump 12, providing a controlled volume of extrudate out of the melt pump 12. If the molds are in a remote position, the extrudate passes through a hose or conduit 13 to a nozzle 14. As the extrudate emerges from the nozzle 14, it is cut by a rotating blade 15 into individual pellets and deposited into successive cavities as they are conveyed beneath the cutter blade 15.

Such a process has previously been unsuccessful in the molding resin containing metallic pigment additives due to the formation of an aesthetically objectionable pellet blemish on the surface of the article. For example, when the article is a closure having a base wall and a peripheral skirt, with threads on a surface thereof, such a blemish is readily noticed on the base wall. We have found that the above described delivery system causes the metallic flakes in the pigment to align in the direction of flow through the hose and nozzle such that they are parallel with the axis of the cylindrical shaped pellet as it exits the nozzle.

Figure 2:
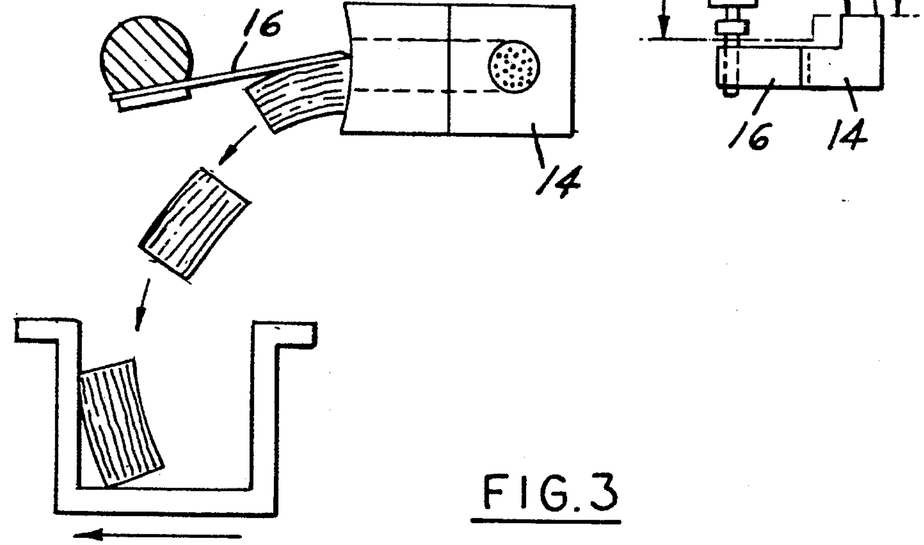
FIG. 2 is a schematic view of a further portion of the prior art method.

Referring to FIG. 2, during the cut off of the pellet, this alignment remains largely undisturbed, such that at the juncture of the cylindrical sides of the pellet and the circular ends of the pellet, there is an abrupt change in alignment of the metallic flakes. We have found that this change in alignment is a major contributor of the pellet blemish effect, whereby the pellet is deposited in the cool cavity in a fairly random way, and the flake alignment becomes "frozen in" as the "skin" solidifies during forming against the cool cavity.

The material flow action during compression molding differs from that of injection molding. In compression molding, the initial outer layer of the pellet in contact with the cavity essentially does not flow when the mold is open and must close fully before the material is displaced to fill the mold. At this time only, the inner material is flowing. This differs from injection molding where the material flows in from a central gate of small diameter, and immediately flows radially outward into a fully closed mold. This flow in injection molding results in alignment of the flakes as the melt is forced through the thin sections of the closed mold immediately. Alignment of the flakes parallel to the closure wall results in a good metallic appearance.

We have found that to address this problem in compression molding from a melt supplied in pellet form, it is necessary to randomize the flake particles immediately before entering the mold. This dispersal of flakes in the finished product reduces the effect of the abrupt change in alignment of the metallic flakes previously evident at the junction of the pellet ends and sides. Generally, however, any dispersal of orientation of the flakes also reduces somewhat the overall metallic effect at the top of the article such as a closure.

Figure 3:
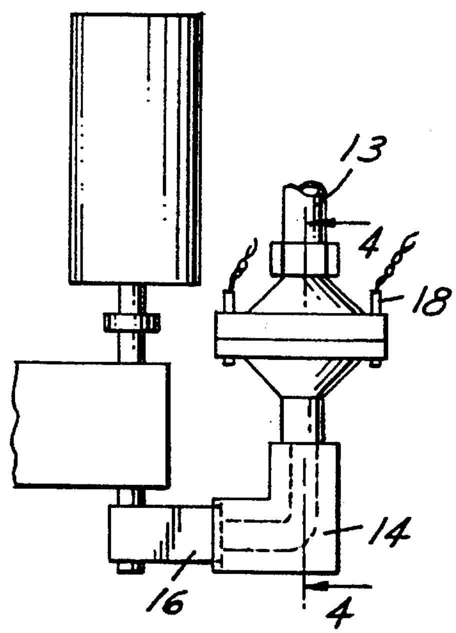
FIG. 3 is a schematic view of a portion of the method in accordance with the invention.
Figure 4:
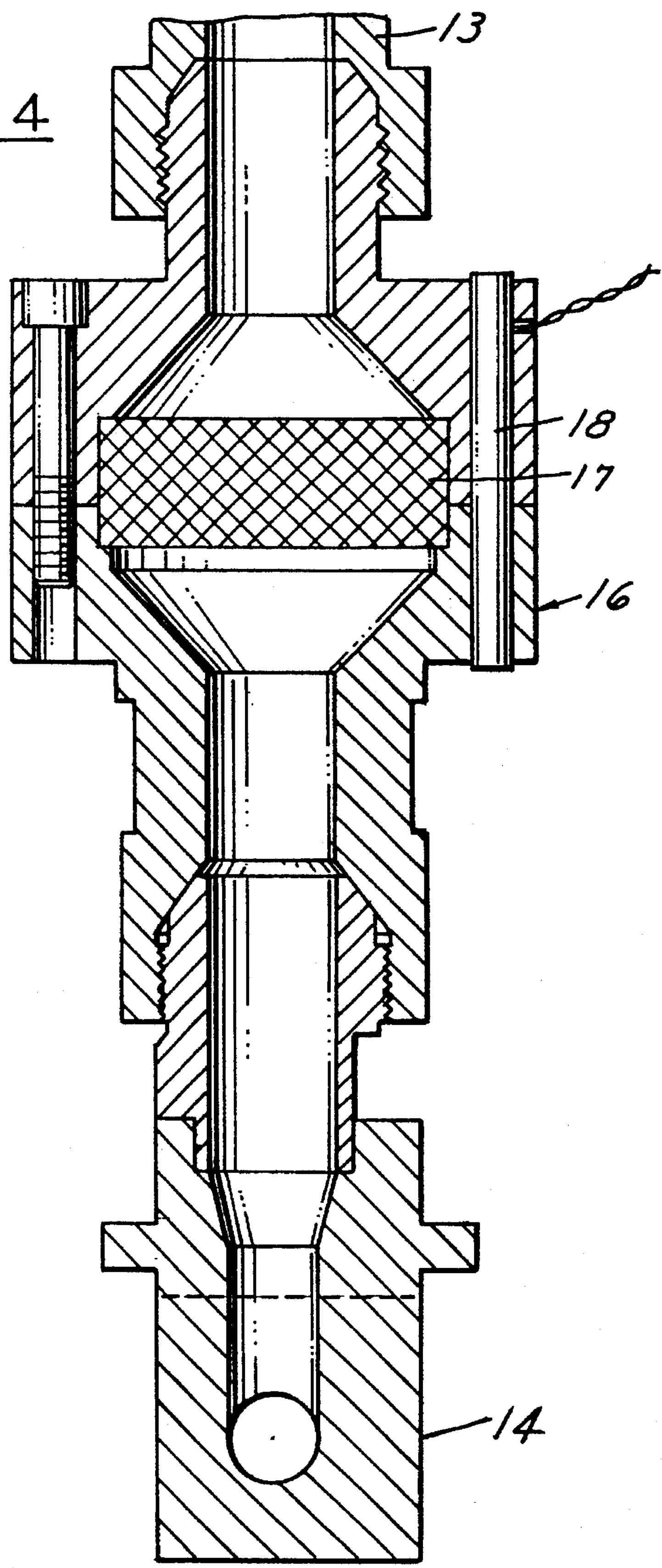
FIG. 4 is a sectional view of a portion of an apparatus utilized in the method of the invention.

We have found that by adding a suitable blowing agent with the resin, it is possible to further increase the randomization of the flakes by using a heated mixer device 16 just prior to the nozzle 14 (FIGS. 3 and 4). The mixer plate comprises a plurality of stationary elements 17 in a housing 16 having controlled heating elements 18 for homogenizing the melt stream as is well known in the art, enclosed in a heated housing, the temperature of which can be controlled. Satisfactory elements are made by Koch Engineering Company, Inc., of Kearsarge, N.H., in accordance with U.S. Pat. Nos. 3,785,620 and 3,871,624.

By adding a suitable blowing agent with resin, it is possible to further increase the randomization of the flakes and by using endothermic agents, the degree of foaming can be controlled at the mixer plate by use of controlled heating via cartridge heaters. However, exothermic agents have also given satisfactory results.

We have found that the temperatures prior to extrusion are preferably controlled such that the blowing agent is at its actuation temperature just prior to extrusion of the melt from the nozzle. This is achieved by controlling the temperatures of the melt.

The combination of blowing agent and a mixer plate has been found to provide other advantages: by encouraging further foaming at the mixer plate by heat control, the mixer plate is more effective, due to the added mixing effect of the foam, and possibly an increase in pressure drop across the mixer plate.

It has been found that the method of the present invention produces satisfactory articles such as plastic closures having a base wall and a peripheral skirt having internal threads from plastic resins such as polyolefins. Satisfactory closures have been produced from polypropylene and polyethylene resins containing metallic flakes.

Satisfactory blowing agents may comprise well known blowing agents including azodicarbonamide, a mixture of sodium bicarbonate and citric acid and a mixture of polycarbonic acids and inorganic carbonate compounds.

The amount of blowing agent used is sufficient to reduce substantially the blemishes normally occurring in compression molding of resins containing metallic flakes. Furthermore, the amount of blowing agent must not be so great that the gaseous cells in the extruded resin will not be dissipated by the compression molding step and will remain in the molded article such that they are visible in any normal inspection.

Specific blowing agents which have been used comprise: an exothermic blowing agent such as azodicarbonamide blended in an ethylene vinyl acetate copolymer carrier with an activator sold by Quantum Chemical Corporation, Cincinnati, Ohio, under the trademark "Spectratech FM 1062F" and having an activation temperature of 160° C.; an exothermic blowing agent such as azodicarbonamide (non-plating grade) sold by Uniroyal Chemical Company, Inc., Middlebury, Conn., under the trademark "CELOGEN AZNP130", 3 micron particle size; an endothermic blowing agent such as sodium carbonate and citric acid sold by Boehringer Ingelheim, Germany, under the tradename "Hydrocerol" and an endothermic blowing agent such as a mixture of polycarbonic acids and inorganic carbonate compounds in a polymeric carrier sold by J. M. Huber Corporation, Havre de Grace, Maryland, under the trademark "Activex 235".

The amount of azodicarbonamide as a blowing agent preferably ranges between about 0.2% and 0.3% of the resin by weight. The amount of sodium bicarbonate and citric acid as a blowing agent ranges between about 0.25% and 0.5% of the resin by weight.

Satisfactorily, metallic particles comprise bronze or aluminum flakes which are opaque to visible light and are less than a micron in thickness and under 50 microns in length.

EXAMPLE I

Satisfactory results were achieved in compression molding of polypropylene closures using the azodicarbonamide blowing agent (non-plating grade) "Spectratech FM 1062F" wherein the blowing agent and carrier comprised about 1.8 to 2.0% of the polypropylene resin by weight; namely, about 0.24% azodicarbonamide (non-plating grade) in the melt.

EXAMPLE II

Satisfactory results were achieved in compression molding high density polyethylene closures using the blowing agent "Activex 235" wherein the blowing agent and carrier comprised about 2.4% of the resin melt.

EXAMPLE III

Satisfactorily results were achieved wherein the sodium carbonate and citric acid blowing agent "Hydrocerol" comprised was 0.33% of the resin by weight wherein the blowing agent was in powder form With mineral oil added for adhesion, the blowing agent having an activation temperature of 150° C. and is endothermic.

EXAMPLE IV

Satisfactory results were achieved where the blowing agent "Activex 235" in a polymeric carrier was introduced into a high density polyethylene resin in an amount of 2.4% by weight, the blowing agent being endothermic.

In each of the above examples, the resultant closures were substantially free of blemishes and did not have visual cells.

It has been found that by controlling heat of the extruder 11, melt pump 12, line 13 and mixer 14, where a mixer is used, the heat of the melt and blowing agent can be controlled such that the temperature of the blowing agent is raised to its actuation temperature Just prior to passing through the nozzle.

Alternatively, utilizing an endothermic blowing agent, the temperature can be controlled to prevent premature actuation of the blowing agent.

It can thus be seen that there has been provided a method that results in reducing substantially the blemishes normally occurring in compression molding.

Although the invention has been described in connection with compression molding plastics containing metallic particles, it is also applicable to compression molding plastics containing particles which are insoluble and have a higher melting temperature than the plastic such that they would tend to cause blemishes in compression molding.

We claim:

1. In a method of compression molding a closure wherein a thermoplastic resin is mixed with additives including a particle pigment additive extruded through a nozzle, cut into individual pellets, each pellet is deposited into the cavity of a mold which is then closed to compression mold an article, the improvement comprising adding a blowing agent to the resin prior to extrusion in a quantity sufficient to randomize the particles in the pigment additive, positioning a heated mixer device in the path of the resin immediately prior to the nozzle for heating the melt to an activation temperature such that the blowing agent is activated just prior to extrusion of the melt from the nozzle such that gaseous bubbles are provided in the extruded melt and such that the gaseous bubbles are substantially dissipated before the compression molding is completed to form an article.

2. In a method of compression molding a closure wherein a thermoplastic resin is mixed with additives including a particle pigment additive, extruded through a nozzle, cut into individual pellets, each pellet is deposited into the cavity of a mold which is then closed to compression mold an article, the improvement comprising adding a blowing agent to the resin prior to extrusion in a quantity sufficient to randomize the additives in the particle pigment additive, and controlling the activation temperature of said melt such that the blowing agent reaches 150° C. activation temperature just prior to extrusion through the nozzle, such that gaseous bubbles are provided in the extruded melt and such that the gaseous bubbles are substantially dissipated before the compression molding is completed to form an article.

3. In a method of compression molding a closure having a base wall and peripheral skirt with internal threads wherein a thermoplastic resin is mixed with additives including a particle pigment additive comprising metallic particles, extruded through a nozzle, cut into individual pellets, each pellet is deposited into the cavity of a mold which is then closed to compression mold a closure, the improvement comprising adding a blowing agent to the resin prior to extrusion in an amount sufficient to randomize the metallic particles in the particle pigment additive as the melt is extruded from the nozzle such that gaseous bubbles are present in the extruded melt after extrusion from said nozzle and in an amount only sufficient that the gaseous bubbles are substantially dissipated before the compression molding is completed to form an article.

4. The method set forth in claim 3 including the step of positioning a heated mixer device in the path of the resin immediately prior to the nozzle for heating the melt to an activation temperature such that the blowing agent is activated just prior to extrusion of the melt from the nozzle.

5. The method set forth in claim 4 wherein said blowing agent comprises a mixture of sodium bicarbonate and citric acid.

6. The method set forth in claim 5 wherein the blowing agent comprises 0.25% to 0.5% of the resin by weight.

7. The method set forth in claim 4 wherein the amount of sodium bicarbonate and citric acid comprises 0.33% of the resin by weight.

8. The method set forth in claim 4 wherein said blowing agent comprises a mixture of polycarbonic acids and inorganic carbonate compound.

9. The method set forth in claim 3 wherein the blowing agent comprises azodicarbonamide.

10. The method set forth in claim 9 wherein the amount of blowing agent comprises 0.25% to 0.3% of the resin by weight.

11. The method set forth in claim 9 wherein the amount of azodicarbonamide comprises 0.25% of the resin by weight.

12. The method set forth in claim 3 including the step of controlling the activation temperature of said melt containing the melt such that the blowing agent reaches 150° C. activation temperature just prior to extrusion through the nozzle.

13. In a method of compression molding a closure having a base wall and peripheral skirt with internal threads wherein a thermoplastic resin is mixed with additives including a particle pigment additive, extruded through a nozzle, cut into individual pellets, each pellet is deposited into the cavity of a mold which is then closed to compression mold a closure, the improvement comprising adding a blowing agent to the resin prior to extrusion in an amount sufficient to randomize the additives in the particle pigment additive such that gaseous bubbles are provided in the extruded melt and in an amount sufficient that the gaseous bubbles are substantially dissipated before the compression molding is completed to form an article, said particle pigment additive comprising metallic particles, the step of positioning a heated mixer device in the path of the resin immediately prior to the nozzle for heating the melt to an activation temperature such that the blowing agent is activated just prior to extrusion of the melt from the nozzle.

14. In a method of compression molding a closure having a base wall and peripheral skirt with internal threads wherein a thermoplastic resin is mixed with additives including a particle pigment additive, extruded through a nozzle, cut into individual pellets, each pellet is deposited into the cavity of a mold which is then closed to compression mold a closure, the improvement comprising adding a blowing agent to the resin prior to extrusion in an amount sufficient to randomize the additives in the particle pigment additive such that gaseous bubbles are provided in the extruded melt and in an amount sufficient that the gaseous bubbles are substantially dissipated before the compression molding is completed to form an article, the step of controlling the activation temperature of said melt containing the melt such that the blowing agent reaches 150° C. activation temperature just prior to extrusion through the nozzle.

* * * * *